(12) United States Patent
Cole et al.

(10) Patent No.: US 12,292,644 B2
(45) Date of Patent: May 6, 2025

(54) DISPLAY DEVICE AND PHOTOMASK THEREFOR

(71) Applicant: Envisics Ltd, Milton Keynes (GB)

(72) Inventors: Alexander Cole, Milton Keynes (GB); Neil Collings, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 4 days.

(21) Appl. No.: 17/847,453

(22) Filed: Jun. 23, 2022

(65) Prior Publication Data
US 2023/0011653 A1   Jan. 12, 2023

(30) Foreign Application Priority Data

Jul. 8, 2021   (GB) ..................................... 2109865

(51) Int. Cl.
| | |
|---|---|
| *G02F 1/1335* | (2006.01) |
| *G02B 27/01* | (2006.01) |
| *G02F 1/1362* | (2006.01) |
| *G03H 1/00* | (2006.01) |

(52) U.S. Cl.
CPC ... *G02F 1/133516* (2013.01); *G02B 27/0103* (2013.01); *G02F 1/133504* (2013.01); *G02F 1/133512* (2013.01); *G02F 1/136277* (2013.01); *G02F 2201/305* (2013.01)

(58) Field of Classification Search
CPC ......... G02F 2201/305; G02F 1/133512; G02F 1/136277
See application file for complete search history.

(56) References Cited

U.S. PATENT DOCUMENTS

| | | | | |
|---|---|---|---|---|
| 6,346,977 | B1* | 2/2002 | Westerman | G02F 1/133512 349/158 |
| 2006/0055857 | A1* | 3/2006 | Hsieh | G02F 1/136277 349/137 |
| 2006/0082564 | A1* | 4/2006 | Poliankine | G02F 1/13452 345/204 |
| 2008/0123040 | A1* | 5/2008 | Yang | G02F 1/136209 349/151 |
| 2015/0241606 | A1* | 8/2015 | Kim | G02B 1/18 359/566 |
| 2019/0088904 | A1* | 3/2019 | Cho | H10K 59/122 |
| 2019/0250308 | A1 | 8/2019 | Kim | |
| 2023/0251407 | A1* | 8/2023 | Chong | G02B 5/1819 359/569 |

OTHER PUBLICATIONS

Combined Search and Examination Report issued in GB 2109865.2, mailed Apr. 12, 2022 (8 pages).

* cited by examiner

*Primary Examiner* — Alexander P Gross
(74) *Attorney, Agent, or Firm* — Akerman LLP

(57) ABSTRACT

A display device, a photomask for a display device and a method for fabricating a display device comprising the photomask is described. The display device comprises a plurality of pixels arranged to spatially modulate light having a first characteristic. The display device further comprises a pixel mask structure. The pixel mask structure comprises a diffractive pattern that is configured to diffract light having the first characteristic and to transmit light having a second characteristic (without diffraction). The diffractive pattern of the pixel mask structure substantially surrounds the plurality of pixels.

13 Claims, 9 Drawing Sheets

DISPLAY DEVICE AND PHOTOMASK THEREFOR

CROSS-REFERENCE TO RELATED APPLICATIONS

This application claims priority under 35 U.S.C. § 119 to Patent Application GB 2109865.2, titled "Display Device and Photomask Therefor," filed on Jul. 8, 2021. The entire contents of GB 2109865.2 are incorporated by reference herein for all purposes.

FIELD

The present disclosure relates to a display device. More specifically, the present disclosure relates to a holographic display device and a photomask for a holographic display device. The present disclosure also relates to a method of fabricating a display device having a photomask, a photomask and a mask pattern generator or reticle for fabricating the photomask. The present disclosure further relates to a holographic projector, a method of holographic projection and holographic projection system. Some embodiments relate to a head-up display and a head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

When illuminated with light from a light source, a spatial light modulator encoded with a computer-generated hologram spatially modulates the incident light. The spatially modulated light forms a holographic reconstruction (or "replay image") of the hologram at a replay field (or "display area") on a replay plane. Light that is not spatially modulated by pixels of the spatial light modulator may also reach the replay field. In particular, light incident on the spatial light modulator in an area outside the active pixel area of the plurality of pixels may be reflected (or transmitted) to the replay field. Such light does not contribute to the replay image and so may regarded as "noise". For example, certain features of the spatial light modulator formed within an area surrounding the plurality of pixels (e.g. electrical tracks such as signal or power lines) may cause high intensity reflections of incident light, which may create undesirable artefacts that are visible in the replay field. In order to reduce the creation of such artefacts, it is desirable to mask the area around the plurality of pixels, for example by forming a mask on the surface of the spatial light modulator. The mask comprises an opaque barrier that blocks light that is incident on the masked area, corresponding to an area surrounding the plurality of pixels, on the surface of the spatial light modulator. It may be said that the mask forms an aperture for incident light. In addition, in the case of a reflective spatial light modulator, the mask also blocks light reflected back to the masked area. In this case, it may be said that the mask also forms an aperture for reflected light.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is provided a display device arranged to spatially modulate light having a first characteristic. The display device comprises a plurality of pixels. The display device further comprises a pixel mask structure having a diffractive pattern. The diffractive pattern is configured to diffract light having the first characteristic and transmit light having a second characteristic (without diffraction). The pixel mask structure substantially masks around the plurality of pixels. In particular, the diffractive pattern of the pixel mask structure substantially surrounds the plurality of pixels, for instance the diffractive pattern surrounds an aperture for the plurality of pixels.

The display device may be planar and comprise a first major surface arranged to be illuminated with light having the first characteristic. The area of the plurality of pixels forms an active pixel area (or simply "pixel area") of the display device. For example, the plurality of pixels may comprise a substantially rectangular array of pixels such that the pixel area is substantially rectangular. The pixel area is in a plane substantially parallel to the first major surface. The plurality of pixels spatially modulate light having the first characteristic. The pixel mask structure is in a plane substantially parallel to the first major surface.

In embodiments, the diffractive pattern of the pixel mask structure comprises masked/opaque regions and unmasked/transparent regions. Light having the first characteristic that is incident on the unmasked/transparent regions is diffracted. Light having the second characteristic that is incident on the unmasked/transparent regions is transmitted (e.g. passes through unmasked regions without diffraction).

The pixel mask structure substantially surrounds an area corresponding to the pixel area. For example, the pixel mask structure may partially or completely surround the area so as to mask the pixel area. It may be said that the pixel mask structure, for example the diffractive pattern of the pixel mask structure, defines an aperture for illumination of the plurality of pixels. In particular, the aperture of the pixel mask structure allows incident light of the first characteristic to enter into the display device. Thus, the whole of the pixel area, and thus the plurality of pixels, is illuminated with incident light of the first characteristic. It may be said that the pixel mask structure delineates, defines or delimits the pixel area.

The pixel mask structure comprises a diffractive pattern of masked/opaque regions and unmasked/transparent regions formed in a first area thereof surrounding the aperture. Thus, some of the light having the first characteristic incident on the first area of the pixel mask structure is blocked by the masked/opaque regions of the diffractive pattern. The masked/opaque regions of the diffractive pattern consume or occupy a defined proportion of the first area (i.e. a proportion of the total area of the diffractive pattern). Thus, the amount of incident light having the first characteristic that is allowed to enter the display device through the first area is reduced by the defined proportion. In consequence, the amount of light that is incident on an area of the display device surrounding the active pixel area corresponding to the first area is reduced by the defined proportion.

Furthermore, the (reduced amount of) incident light having the first characteristic that is allowed to enter the display device through the first area of the pixel mask structure is diffracted by the diffractive pattern. Thus, the light that is incident on an area of the display device surrounding the active pixel area corresponding to the first area is spread out or diffused. Since the light incident on this area of the display device is spread out or diffused, the intensity of light per unit area (i.e. luminance) is reduced.

Accordingly, the diffractive pattern of the pixel mask structure reduces the incident light of the first characteristic that may reach features of the display device formed in an area surrounding the active pixel area corresponding to the first area (e.g. electrical traces and peripheral components), which are capable of creating artefacts. In particular, in consequence of the diffractive pattern, such features are illuminated with diffuse light of the first characteristic. In consequence, reflections of incident light by such features have low intensity and are diffuse or spread out. Thus, any such reflections that reach the replay field (or display area) of the display device do not form visible artefacts but merely contribute to background noise.

In some embodiments, the pixel mask structure is disposed on the first major surface of the display device. Thus, in these embodiments, the pixel mask structure is formed on a front surface of the display device. For example, the pixel mask structure may be formed on a glass cover plate of the display device.

In other embodiments, the pixel mask structure may be disposed on a plane parallel to the first major surface of the display device (i.e. parallel to the front surface of the display device). For example, the pixel mask structure may be disposed on plane corresponding to a layer of the display device (e.g. formed over a semiconductor device layer). The pixel mask structure may be disposed on a plane (e.g. formed over a semiconductor device layer) containing at least one electrode of the display device, such as a plane containing a common electrode or a plane containing a pixel electrode of each pixel. Thus, the pixel mask structure may be disposed on a silicon layer or substrate (e.g. CMOS layer or substrate).

In embodiments, the characteristic is wavelength of light. For example, the first characteristic of light may correspond to light of a visible or infra-red wavelength, or may correspond to a range of wavelengths in the visible or infra-red spectrum.

In embodiments, the second characteristic is an ultra-violet wavelength, or range of wavelengths in the ultra-violet spectrum.

In some embodiments, the diffractive pattern of the pixel mask structure comprises a diffraction grating pattern. For example, the pixel mask structure may comprise masked/opaque regions arranged as a series of evenly spaced parallel one-dimensional lines. Thus, the unmasked/transparent regions are arranged as a corresponding series of evenly separated parallel slits having a defined slit width. The configuration (e.g. slit width/slit spacing) of one-dimensional slits of the diffraction grating pattern diffracts the light of the first characteristic so as to spread the light in one dimension (i.e. perpendicular to the length/parallel to the width of the slits of the diffraction grating pattern). Accordingly, in embodiments, the diffraction grating pattern is selected to diffract light of visible and infra-red wavelengths whilst passing or transmitting light of ultra-violet wavelengths (without diffraction). For instance, the slit width may be in the range of 2 to 6 Linn, such as about 4 µm.

In one example, the transparent slits and opaque lines of a diffractive grating pattern may have the same width. For instance, if the slit width is 4 µm, then the width of the opaque lines (i.e. slit spacing) is also 4 µm. Thus, the masked/opaque regions occupy substantially 50% of the first area. In this example, the amount of light that is able to enter the display device through the first area is reduced by 50%. Other configurations of slit width and slit spacing (i.e. line width) are possible and contemplated.

In some other embodiments, the diffractive pattern of the pixel mask structure comprises a checkerboard pattern. For example, the diffractive pattern may comprise masked/opaque regions arranged in a first checkerboard pattern (e.g. in the pattern of black squares of a checkerboard) and unmasked/transparent regions arranged in a second checkerboard pattern, complementary or opposite to the first checkerboard pattern (e.g. in the pattern of white squares of a checkerboard). This may correspond to a pattern comprising first and second diffraction grating patterns arranged orthogonally to each other. In particular, the squares of the first and second checkerboard patterns have substantially the same dimension as the width of one-dimensional slits of first and second diffraction grating patterns. Thus, the diffraction pattern diffracts light having the first characteristic in two dimensions. When the pixel mask structure is disposed on a plane (e.g. semiconductor device layer) containing an electrode of the display device, the diffraction pattern arranged as a checkerboard pattern may provide improved electrical contact, as described further below.

In a modification of embodiments in which the diffractive pattern comprises a checkerboard pattern, each masked/opaque region is extended to interconnect with diagonally adjacent masked/opaque regions. For example, an interconnecting masked/opaque region is formed between diagonally adjacent masked/opaque regions. The sides of the interconnecting masked/opaque regions may be curved so that the corners of the unmasked/transparent regions of the diffractive pattern are also curved. The interconnecting masked regions may further improve electrical contact of the pixel mask structure with the surface containing an electrode of the display device on which it is disposed, whilst maintaining the two-dimensional light diffraction/spreading effect.

In some embodiments, the pixel mask structure comprises a masked area substantially surrounding the diffractive pattern. For example, the masked area may be formed in a second area surrounding the first area (e.g. concentric with the first area). The masked area comprises an opaque area that blocks light of the first characteristic and the second characteristic. The masked area may protect features of the display device in an area corresponding to the second area from exposure to incident light.

In some embodiments, the display device is a reflective display device. Thus, incident light enters, and is reflected back, through the first major surface of the display device. Light having the first characteristic that is incident on the active pixel area of the display device is spatially modulated by the plurality of pixels. The spatially modulated light is transmitted through the unmasked central aperture formed by the pixel mask structure. In addition, some of the light that is incident on the first area of the pixel mask structure enters the display device. This light may be incident on features of the display device in an area surrounding the active pixel area of the display device and reflected by such features as unmodulated light back towards the diffractive pattern of the pixel mask structure. The diffractive pattern diffracts and spreads out (diffuses) the unmodulated light, so as to distribute the light away from the replay field, in particular the part(s) of the replay field that are visible to the user. For example, the diffraction grating pattern may be configured with vertical slits that diffract light horizontally so as to form horizontal bands in an area that is not part of the visible replay field. For instance, the visible parts may comprise top and bottom portions of the replay field that are spatially separated from the central horizontal portion wherein the horizontal bands are formed. In addition, or alternatively, the diffraction grating pattern may be configured with a periodicity that diffracts light out of the zero (primary) order in the far field, which forms the visible part(s) of the replay field. Thus, the unmodulated light is redirected by the diffraction pattern so that it is prevented from reaching the visible replay field so that the creation of undesirable artefacts and noise is further reduced.

In embodiments, the display device comprises a spatial light modulator (SLM), such as a Liquid Crystal on Silicon (LCOS) SLM.

There is also provided a photomask for a display device comprising a plurality of pixels arranged to spatially modulate light having a first characteristic. The photomask comprises a pixel mask structure having a diffractive pattern. The diffractive pattern is configured to diffract light having the first characteristic and transmit light having a second characteristic (without diffraction). The pixel mask structure is configured to substantially mask the plurality of pixels. In particular, the diffractive pattern of the pixel mask structure substantially surrounds an aperture for the plurality of pixels.

In embodiments, the pixel mask structure comprises a central aperture and at least a first area arranged concentrically around the aperture. The aperture comprises a transparent or unmasked central area. The first area comprises the diffractive pattern of opaque/masked and transparent/unmasked regions. An optional second area arranged concentrically around the first area comprises a fully opaque or masked area. An optional third area arranged concentrically around the optional second area comprise a transparent or unmasked area.

There is further provided a method of fabricating a display device. The method comprises forming a display device comprising a plurality of pixels on a substrate. The display device is arranged to spatially modulate light having a first characteristic The method further comprises forming a photomask on a plane parallel to a first major surface of the display device. The photomask has the pixel mask structure comprising a diffractive pattern that is configured to diffract light having the first characteristic and to transmit light having a second characteristic. The pixel mask structure masks the plurality of pixels. In particular, [the diffractive pattern of] the pixel mask structure substantially surrounds [an aperture for] the plurality of pixels of the display device. The method further comprises treating the display device by exposing the first major surface of the display device to light having a second characteristic.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality s wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
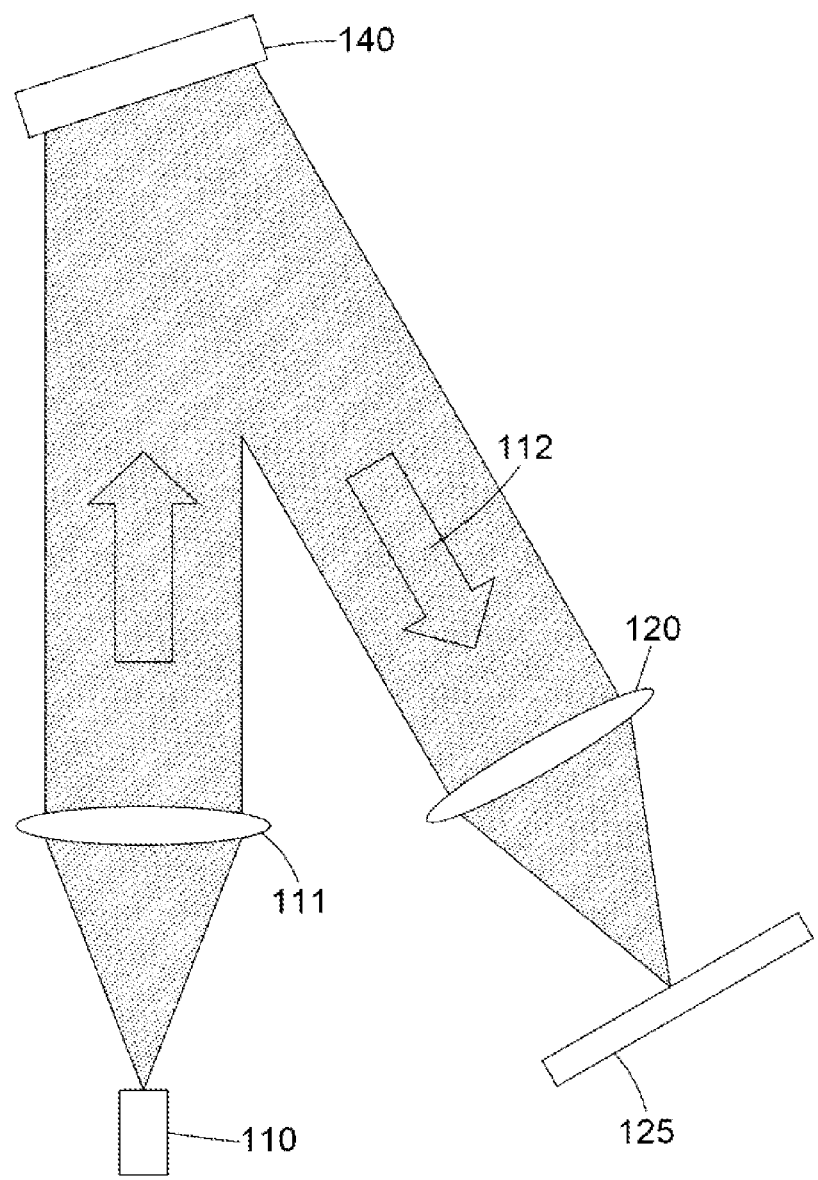
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG.

1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
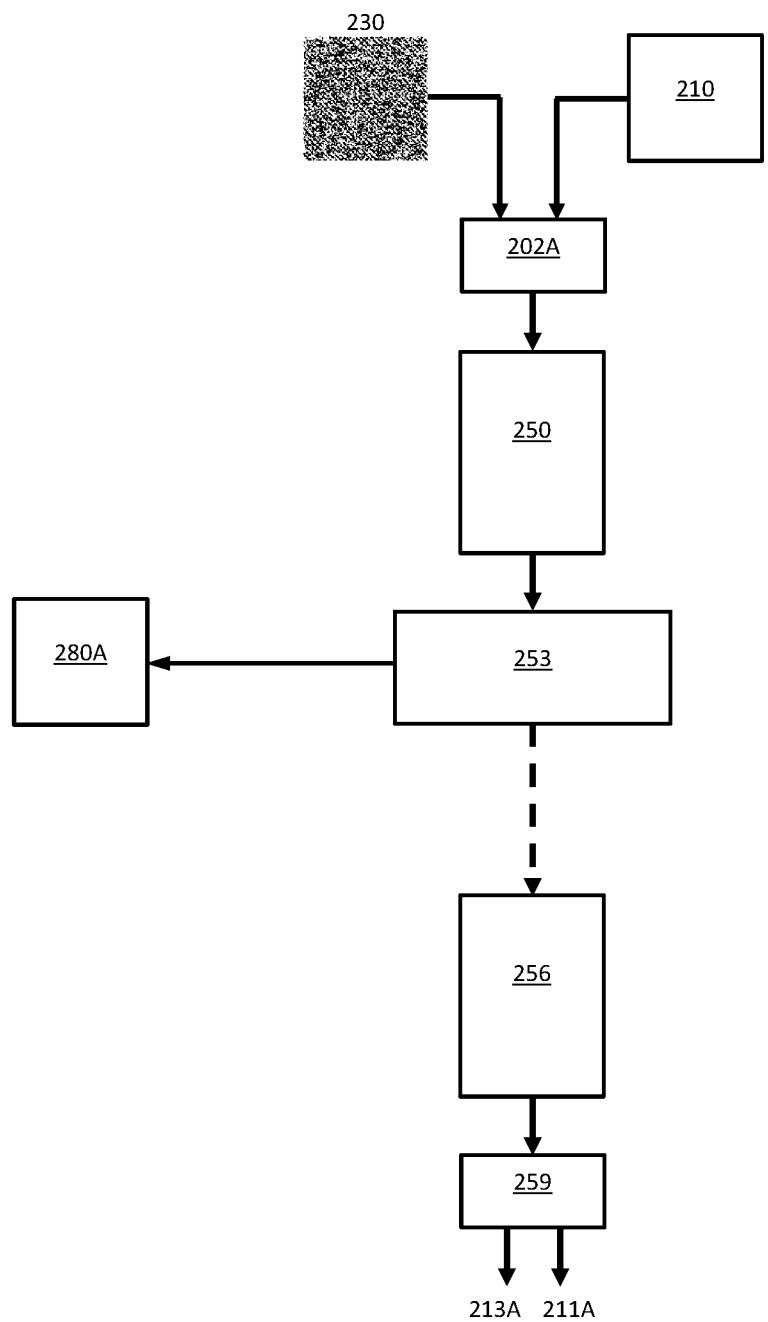
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
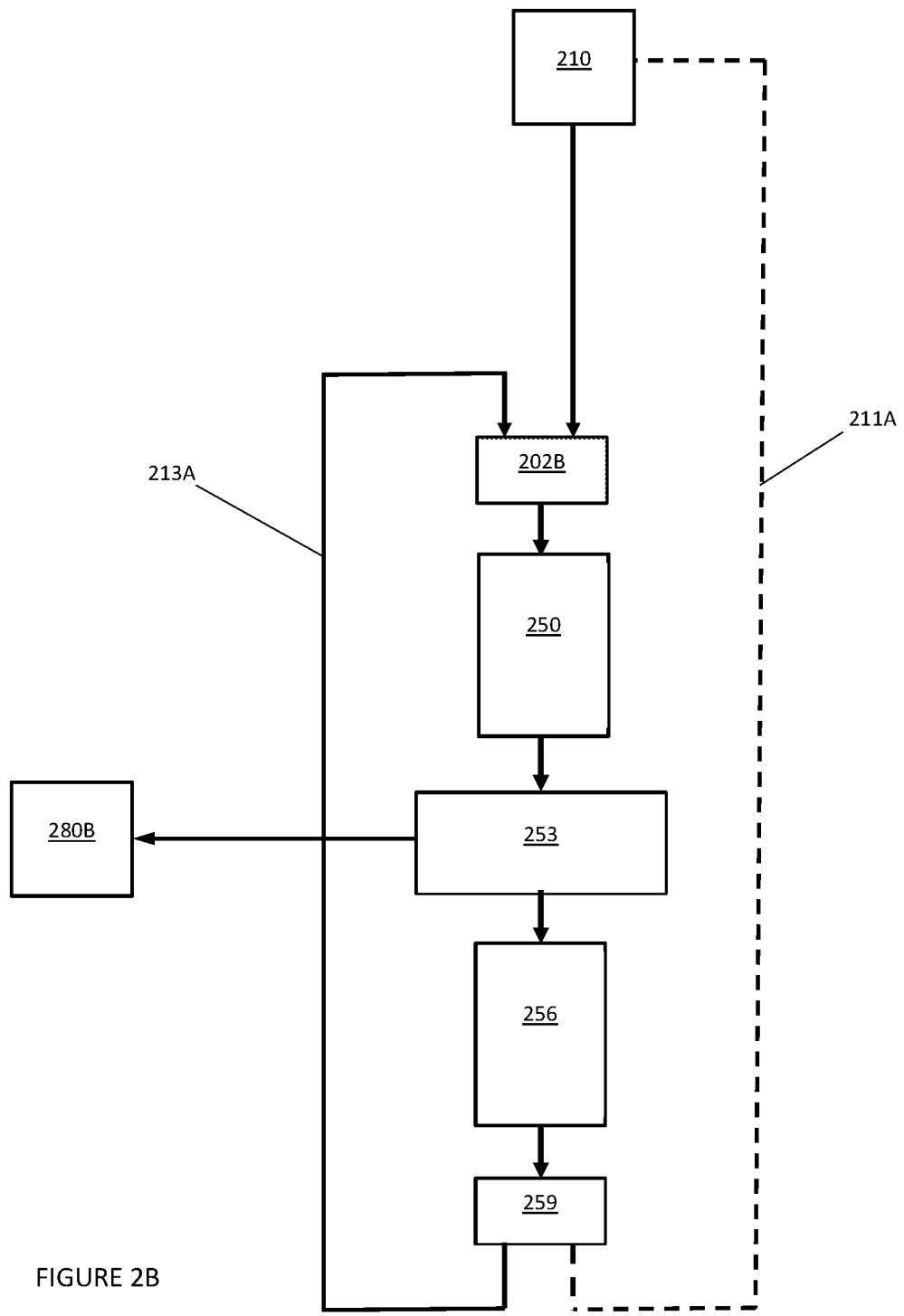
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
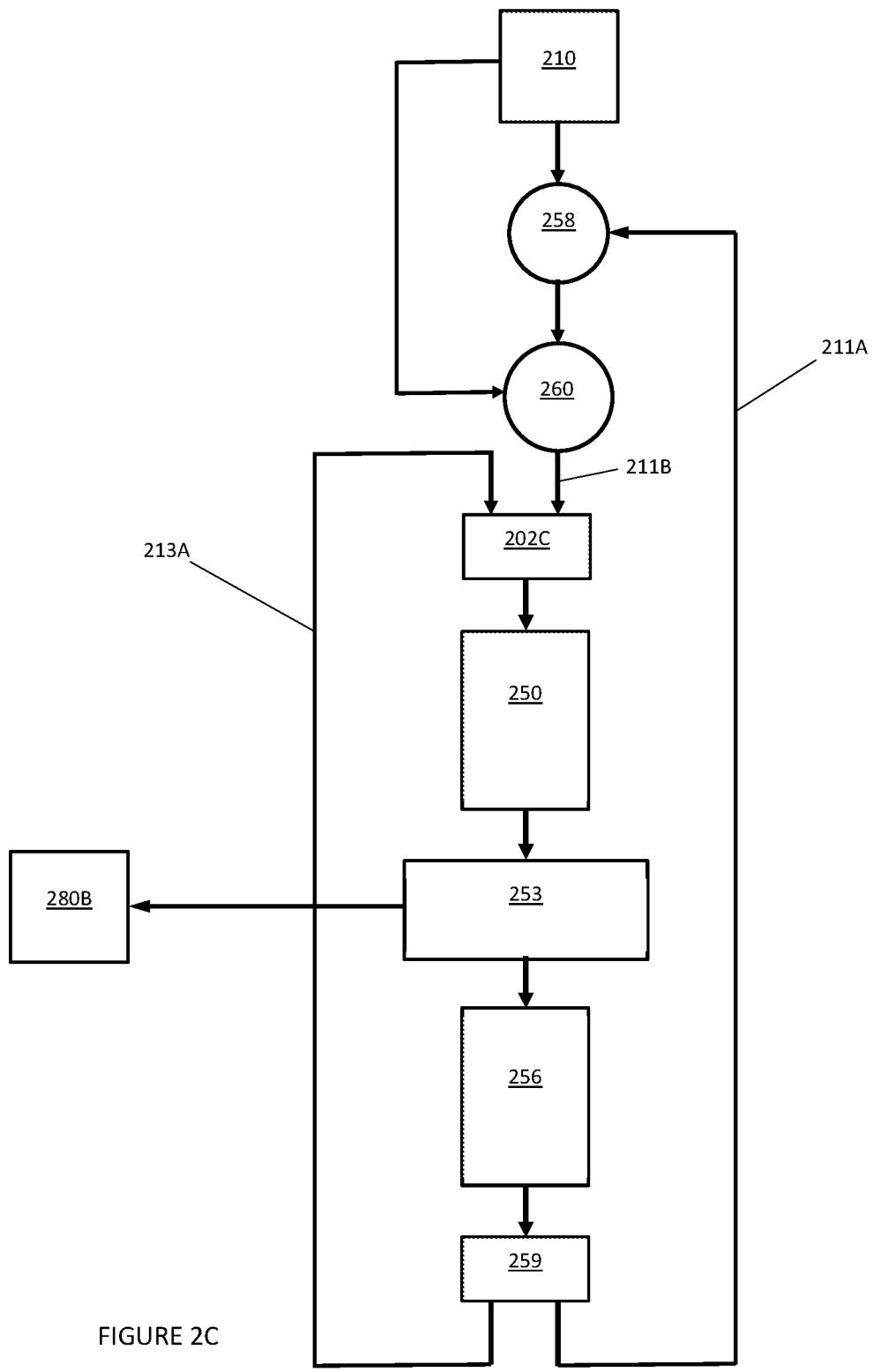
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power.

That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
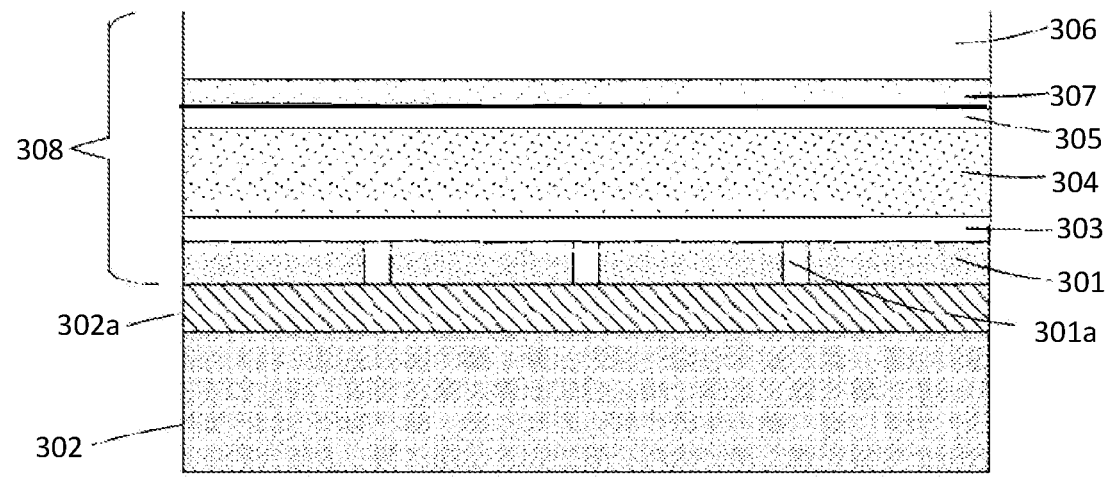
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Pixel Mask Structure

A display device such as a spatial light modulator (e.g. LCOS SLM) may comprise an active display area or pixel area corresponding to the area of a plurality of pixels arranged in an array, and a surrounding non-active display area comprising other features such as interconnect (e.g. electrically conductive lines and vias for providing power and signals to the pixels and other peripheral components).

A pixel mask for a display device is desirable to define an aperture for incident light for illuminating the plurality of pixels during display, and to mask the area around the plurality of pixels. In particular, if non-active areas of the display device beyond the boundary of the pixel area of the display device are not masked, features located within these areas may be illuminated by light from the light source and reflect (or transmit) light to create undesirable artifacts in the display area. It is therefore desirable to mask the region of the display device surrounding the pixel area. Conventionally, a separate physical mask aperture may be provided in front of the display device. However, a separate mask aperture must be aligned with the boundary of the pixels of the display device to prevent too much or too little masking. This requires a complex assembly process to position the mask accurately with respect to each display device. Furthermore, due to alignment tolerances during assembly, the size of the aperture may be made smaller than the size of the pixels array. This guarantees that the aperture only exposes active pixels (i.e. does not expose surrounding features) but results in active pixels of the pixel array being undesirably masked. In another example, a mask aperture may be printed or otherwise formed on the front face of the display device during fabrication. However, the fabrication and/or assembly processes of many display devices, such as spatial light modulators, require treatment of the non-active display areas of the display device by exposure to UV light, for example for the purpose of curing. For example, the assembly process of a LCOS SLM may require exposure of the front surface of the device surrounding the active pixels to UV light, for the purpose of curing a liquid photopolymer glue for sealing/encapsulating the LCOS cell and maintaining a uniform cell thickness, as described in Journal of Display Technology, Vol. 7, No. 3, March 2011, Zhang et al entitled "High Quality Assembly of Phase-Only Liquid Crystal on Silicon (LCOS) Devices". Thus, printing a mask on a layer of the display device is precluded since the mask would prevent such exposure to UV light.

The present disclosure proposes a pixel mask structure that can be formed in a plane of the display device, such as on a layer thereof, during the fabrication process. For example, the pixel mask structure may be formed as photomask on a front major surface of the display device, or on a layer parallel to the front major surface of the display device. In some examples, the pixel mask structure may be formed on a layer comprising one of: pixel electrodes, a common electrode, an alignment layer or a front glass cover, during fabrication of the display device, such as a LCOS SLM as described above. The pixel mask structure provides an aperture for incident light having a first characteristic to illuminate the plurality of pixels in the pixel area in order to form spatially modulated light during display. In addition, the pixel mask structure includes a diffractive pattern substantially surrounding the aperture. The diffractive pattern is configured to diffract incident light having the first characteristic (typically light of infra-red or visible wavelengths) during display, thereby illuminating a corresponding non-active area of the display device with diffuse light. In this way, features within that non-active area receive diffuse rather than high intensity collimated light, which reduces high intensity reflections so as to prevent the creation of artefacts in the display area. The diffractive pattern is further configured to transmit incident light having a second characteristic (typically light of ultra-violet wavelengths), without diffraction. Thus, during fabrication and/or assembly steps that require treatment (e.g. curing) by exposure of the display device to ultra-violet light, the pixel mask structure allows the passage of the ultra-violet light through the diffraction pattern. However, the exposure time or intensity of the ultra-violet light may need to be increased to compensate for the partial blocking effect thereof by the masked/opaque regions of the diffractive pattern.

Embodiments

Figure 4:
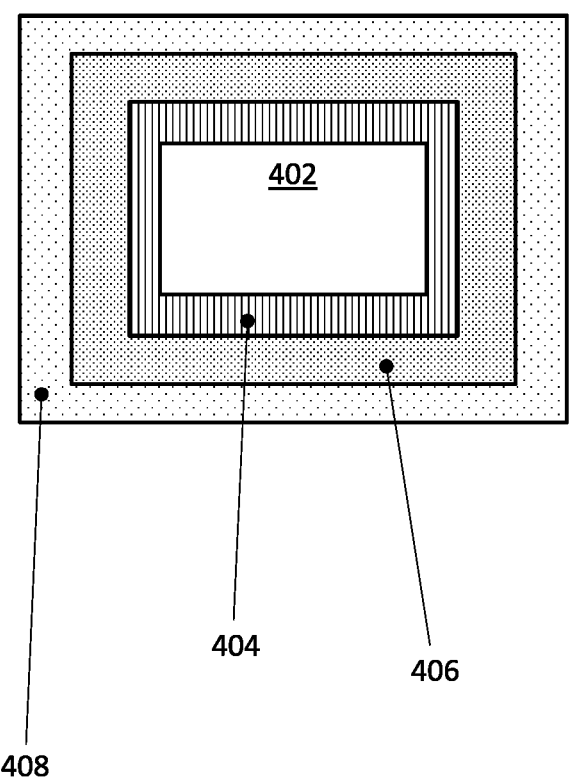
FIG. 4 shows a pixel mask structure in accordance with some embodiments.

FIG. 4 shows a first embodiment of a pixel mask structure 400 according to the present disclosure. The pixel mask structure 400 of FIG. 4 comprises a first area 404 between an inner quadrilateral boundary and an outer, concentric quadrilateral boundary. It may be said that the first area 404 comprises a quadrilateral-shaped annulus. The inner quadrilateral boundary defines (i.e. delineates or delimits) an aperture 402. The aperture 402 is optically transparent, such that light incident on the pixel mask structure 400 is transmitted through the aperture 402. The inner quadrilateral boundary of the first area 404 corresponds to the outer boundary of the active display area or pixel area comprising the plurality of pixels of the display device (not shown). Thus, the first area of the pixel mask structure masks around an area of the display device corresponding to the pixel area. Accordingly, light incident on the display device passes through the aperture 402 of the pixel mask structure 400 so as to illuminate the whole of the pixel area.

The first area 404 of the pixel mask structure 400 comprises a diffractive pattern. The diffractive pattern comprises a diffraction grating pattern (i.e. defining a plurality of parallel slits) configured in accordance with the present disclosure. In particular, the diffractive pattern comprises masked/opaque regions arranged in a pattern defining unmasked/transparent regions forming the slits. Thus, the masked/opaque regions are configured as a plurality of parallel, evenly spaced one-dimensional lines defining unmasked/transparent regions forming a plurality of parallel, evenly spaced one-dimensional slits. Thus, the slits formed by the unmasked/transparent regions have a slit width corresponding to the spacing between the parallel lines of masked/opaque regions. In accordance with the present disclosure, the diffraction grating pattern is configured (e.g. with a slit width/spacing) so that light having a first characteristic that is incident on the unmasked/opaque regions is diffracted by the diffractive pattern. That is, the slits diffract light of the first characteristic. In addition, the diffraction grating pattern is configured (e.g. with a slit width/spacing) so that light having a second characteristic that is incident on the unmasked/transparent regions is transmitted by the diffractive pattern (without diffraction). The first characteristic may correspond to an individual wavelength or a range of wavelengths of light for illuminating the display device during display, such as visible wavelengths (i.e. 400 to 700 nm) and infra-red wavelengths (i.e. 700 nm to 1 mm). The second characteristic may correspond to an individual wavelength or a range of wavelength of light for illuminating the display device for treatment (e.g. curing) during fabrication and/or assembly thereof, such as ultra-violet wavelengths (i.e. 10 to 380 nm). The skilled person will be familiar with techniques for designing a diffraction grating pattern with a configuration that diffracts light having a first characteristic and transmits light having a second characteristic. For example, a diffraction grating pattern may have a slit width (and optionally slit spacing) in the range of 1 to 10 µm, such as about 5 µm.

Another consideration for the design of the periodicity of the diffraction grating pattern is the periodicity of the pixel array formed by the plurality of pixels of the display device. For example, if the periodicity of the grating (i.e. slit width plus slit spacing) is greater than the pixel pitch (i.e. pixel width plus interpixel spacing), then reflected light incident on the diffraction grating pattern will diffract out of the zero (primary) order forming the visible replay field. The periodicity of the grating may be greater than the pixel pitch of the pixel array of the display device. The periodicity of the grating may be greater than 1.5 times the pixel pitch of the pixel array of the display device. The periodicity of the grating may be less than twice the pixel pitch of the pixel array of the display device The slits of the diffraction pattern are typically orientated in a direction parallel to the direction(s) towards the visible part(s) of the replay field. In the diffraction grating pattern formed in first area 404 of FIG. 4, the slits are substantially parallel to one side of the pixel array defined by aperture 402. In particular, the slits are arranged vertically so that light that would otherwise be directed in a vertical direction (i.e. towards the top and bottom of the replay field) is redirected in a horizontal direction. This configuration is suitable for applications that display content in the top and bottom portions of the replay field, whilst masking a central portion. In particular, the vertical slits predominantly diffract the light horizontally into the central portion that is not part of the visible replay field to the user. Other orientations of the diffractive pattern are possible according to application requirements.

The pixel mask structure 400 of FIG. 4 further comprises a second area 406. The second area 406 surrounds the first area 404. In particular, second area 406 is defined between an inner quadrilateral boundary and an outer, concentric quadrilateral boundary. It may be said that the second area 406 comprises a quadrilateral-shaped annulus arranged concentrically with the first area 404. The inner quadrilateral boundary of the second area 406 corresponds to, or is aligned with, the outer boundary of the first area 404. The second area 406 is masked or optically opaque. Thus, the second area 406 defines a second aperture for light having the second characteristic, the second aperture corresponding to the inner boundary thereof. For example, the second aperture may correspond to an outer edge of an area of the first major surface of the display device that needs to be exposed to ultra-violet light for treatment (e.g. curing) during fabrication and/or assembly thereof, as described herein.

The pixel mask structure 400 of FIG. 4 further comprises a third area 408. The third area 408 surrounds the second area 406. In particular, third area 400 is defined between an inner quadrilateral boundary and an outer, concentric quadrilateral boundary. It may be said that the third area 408 comprises a quadrilateral-shaped annulus arranged concentrically with the second area 406. The inner quadrilateral boundary of the third area 408 corresponds to, or is aligned with, the outer boundary of the second area 406. The third area 408 is unmasked or optically transparent. Accordingly, light incident on an area of the first major surface of the display device corresponding to the third area 408 is uncontrolled by pixel mask structure 400.

As described herein, a photomask comprising the pixel mask structure 400 may be disposed in a plane parallel to the front major surface of a display device, such as a spatial light modulator as described herein. The diffractive pattern of the first area 404 of the pixel mask structure 400 reduces the incident light of the first characteristic that may reach features of the display device, which are located in a non-active area surrounding the pixel area corresponding to the first area, that are capable of creating artefacts during display. In particular, in consequence of the diffraction grating pattern, light of the first characteristic is diffracted in one dimension and such features are illuminated with light of the first characteristic that is diffuse or spread out in one dimension. In consequence, reflections of incident light by such features have low intensity and are diffuse or spread out. Thus, any such reflections that reach the replay field (or display area) of the display device have low intensity and so do not form visible artefacts but merely contribute to background noise. In addition, in embodiments comprising a reflective display device, the diffractive pattern is configured to direct light away from visible parts of the replay field, as described above. Thus, the intensity of noise within the visible part(s) of the replay field due to such reflections is reduced, since the light is redirected to masked regions of the replay field (e.g. outside the zero (primary) order) that are not visible to the user.

In the illustrated embodiment, the plurality of pixels is arranged in a rectangular or oblong array, so that the aperture 402 is rectangular or oblong. However, in other embodiments, the plurality of pixels may be formed in an array having any other suitable shape, such as a square or circular array. Furthermore, whilst the width or the first area 404 between the inner and outer quadrilateral boundaries is uniform, in other embodiments, the width of the first area 404 have be different on different sides of the aperture 402. Furthermore, whilst the first area 404 fully surrounds the aperture 402, in other embodiments, the first area 404 may only partially surround the aperture 402.

Figure 5:
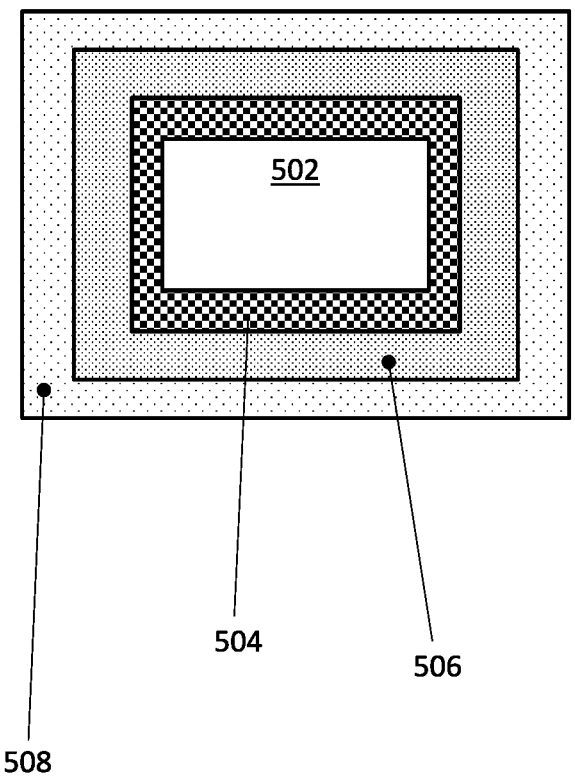
FIG. 5 shows a pixel mask structure in accordance with other embodiments.

FIG. 5 shows a second embodiment of a pixel mask structure 500 according to the present disclosure. The second embodiment is the same as the first embodiment, except for the diffractive pattern of the first area.

Accordingly, pixel mask structure 500 comprises a central, quadrilateral-shaped aperture 502 defined by a first area 504, a second area 506, arranged concentrically around first area 504 and a third area 508 arranged concentrically around second area 506. Each of first 504, second 506 and third 508 areas are defined between respective inner and outer quadrilateral boundaries so as to have a quadrilateral-annulus shape. First area 504 comprises a diffractive pattern, second area 506 is masked or optically opaque and third area is unmasked or optically transparent.

The first area 504 of the pixel mask structure 500 comprises a diffractive pattern having a checkerboard pattern. The checkerboard pattern comprises masked/opaque regions and unmasked/transparent regions. In particular, the diffractive pattern comprises masked/opaque regions arranged in a first checkerboard pattern (e.g. in the pattern of black squares of a checkerboard) and unmasked/transparent regions arranged in a second checkerboard pattern, complementary or opposite to the first checkerboard pattern (e.g. in the pattern of white squares of a checkerboard). It may be said that the diffractive pattern corresponds to first and second diffraction grating patterns arranged orthogonally to each other. In particular, the checkerboard pattern may correspond to a pair of orthogonally orientated diffraction grating patterns comprising a plurality of parallel slits, as described above in relation to the pixel mask structure 400 of FIG. 4. In the second embodiment, the first and second diffraction grating patterns have substantially the same configuration (e.g. slit width/spacing) as each other so as to form squares of masked/opaque and unmasked/transparent regions in accordance with respective first and second checkerboard patterns. Each of the first and second diffraction grating patterns is configured as described above in relation to the diffraction grating pattern of FIG. 4. Thus, the diffraction pattern diffracts light having the first characteristic in two dimensions (i.e. perpendicular to the length/ parallel to the width of the slits of the first and second diffraction grating patterns), whilst passing or transmitting light having the second characteristic (without diffraction). As described above, the first characteristic may correspond to a range of wavelengths of light for illuminating the display device during display, and the second characteristic may correspond to a range of wavelengths of light for illuminating the display device for treatment (e.g. curing) during fabrication and/or assembly thereof.

As described herein, a photomask comprising the pixel mask structure 500 may be disposed in a plane parallel to the front major surface of a display device, such as a spatial light modulator as described herein. The diffractive pattern of the first area 504 of the pixel mask structure 500 further reduces the incident light of the first characteristic that may reach features of the display device, which are located in a non-active area surrounding the pixel area corresponding to the first area 504, that are capable of creating artefacts during display. In consequence of the checkerboard diffraction pattern, light of the first characteristic is diffracted in two dimensions so that such features are illuminated with light of the first characteristic that is diffuse or spread out in two dimensions. In consequence, reflections of incident light by such features have low intensity and are diffuse or spread out. Thus, any such reflections that reach the replay field (or display area) of the display device have low intensity and so do not form visible artefacts but merely contribute to background noise.

As the skilled person will appreciate, the diffraction pattern of the second embodiment has the advantage of two-dimensional diffraction of light of the first characteristic, thereby providing a two-dimensional spreading or diffusing effect. In consequence, any reflections of the diffuse light from features capable of creating undesirable visible artefacts have even lower intensity than with the diffraction grating pattern of the first embodiment.

In the described embodiments, the masked/opaque regions of the pixel mask structure may be formed from chrome or any other suitable material that is optically opaque. However, when a chrome mask is formed over a layer comprising an electrode, conductive interconnect (i.e. conductive vias or lines) or other conductive features of the display device, electrical contact may be adversely affected.

The inventors have found that, in comparison to a diffractive pattern comprising a single diffraction grating pattern, a diffraction pattern arranged as a checkerboard pattern may provide improved electrical contact, when it is disposed on a layer comprising an electrode or other conductive feature, such as a layer comprising a common electrode or pixel electrodes of the LCOS SLM as described herein.

Figure 6:
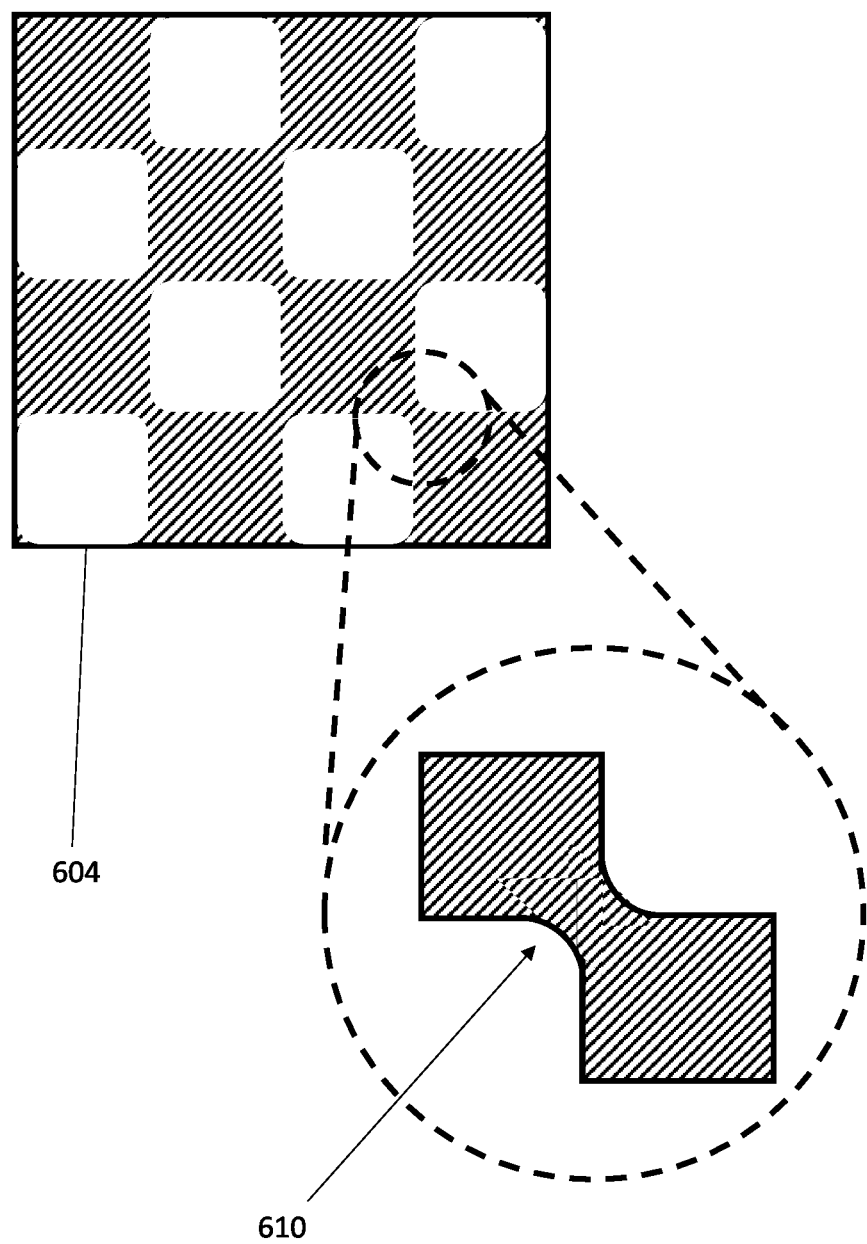
FIG. 6 shows a modification of the pixel mask structure of FIG. 5, including an enlarged view of an interconnecting region thereof, in accordance with other embodiments.

FIG. 6 shows a diffractive pattern of a third embodiment, which is a modification of the diffractive pattern of the second embodiments. In particular, the diffractive pattern of a first area 604 of a pixel mask structure in accordance with the third embodiments comprises a checkerboard pattern, in which each masked/opaque region is extended to interconnect with diagonally adjacent masked/opaque regions. In particular, an interconnecting masked/opaque region 610 is formed between diagonally adjacent masked/opaque regions. The sides of the interconnecting masked/opaque regions 610 may be curved so that the corners of the unmasked/transparent regions of the diffractive pattern are curved. The inventors have found that the interconnecting masked regions 610 may further improve electrical contact when the pixel mask structure is formed on a layer comprising an electrically conductive feature, whilst maintaining the two-dimensional light diffraction/spreading effect of light of the first characteristic.

Fabrication/Assembly and Operation of Display Device

Figure 7:
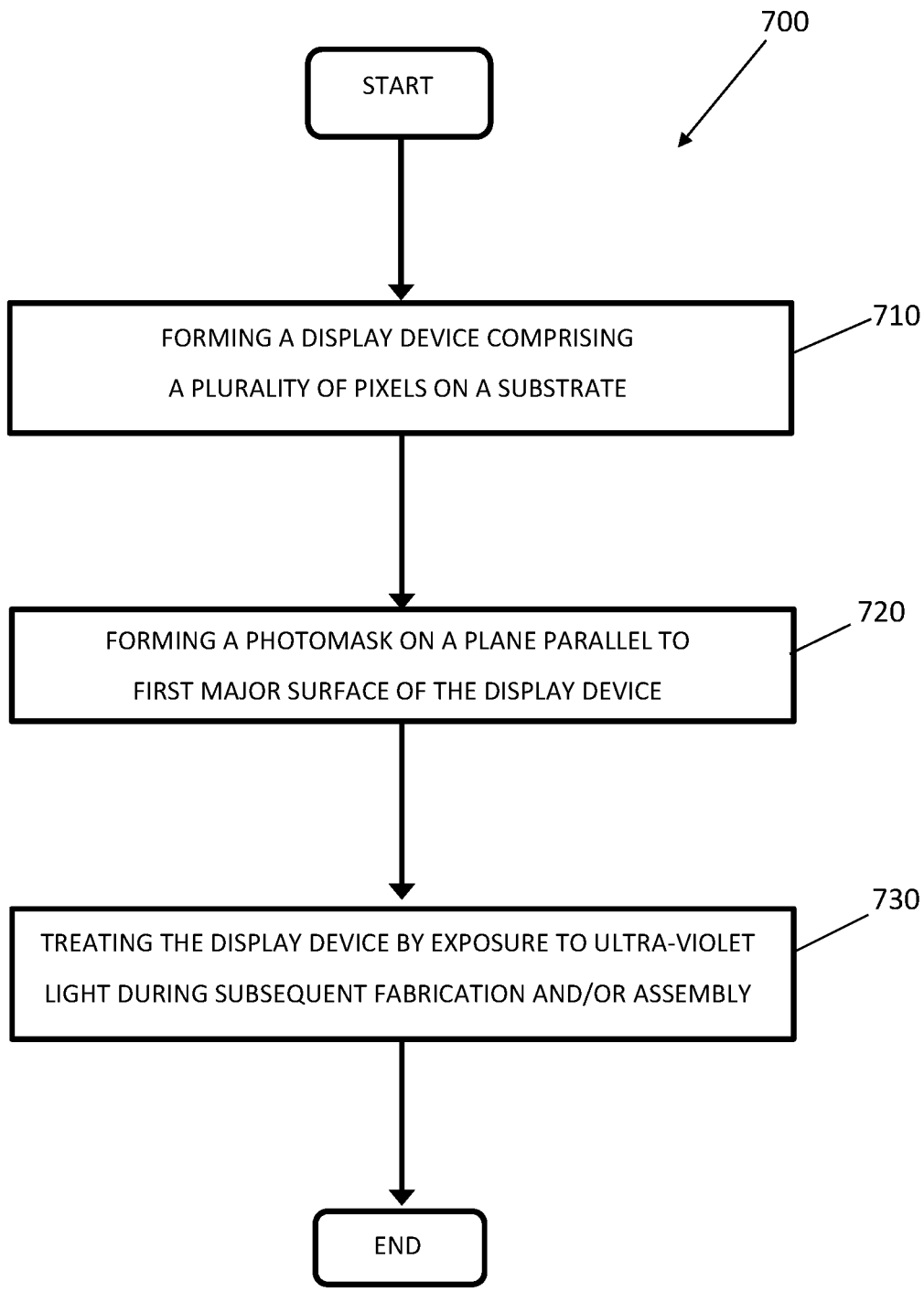
FIG. 7 is a flow chart of a method in accordance with some embodiments.

FIG. 7 shows an example method 700 for fabricating and/or assembly a display device having a photomask comprising a diffractive mask pattern in accordance with the present disclosure.

Step 710 forms a display device comprising a plurality of pixels on a substrate. For example, a LCOS SLM as shown in FIG. 3 may be formed in step 710 using CMOS processes or the like, comprising the following processes. First, an array of square pixel electrodes is formed on an upper surface of a single crystal silicon substrate comprising buried addressing circuitry. For example, the array of pixel electrodes may be formed by depositing an aluminium layer on the substrate and etching the layer to form the spatially separate square pixel electrodes of the array. By using a highly reflective conductive material such as aluminium, the pixel electrodes also act as mirrors so as to form a reflective device. Secondly, a first alignment layer is formed over the array of pixel electrodes. Thirdly, a liquid crystal layer is formed on the alignment layer. Fourthly, a second alignment layer is formed over the liquid crystal layer. Fifthly, a transparent common electrode is formed over the second alignment layer. For example, the common electrode may be formed as a layer of conductive indium-tin-oxide (ITO) above the array of pixel electrodes. Finally, a transparent layer (e.g. glass layer or plate) is formed over the common electrode layer as a front cover plate of the display device. The upper or front surface of the transparent layer forms a first major surface of the display device. As the skilled person will appreciate, process steps for forming other features of the display device are omitted from the above for ease of description.

During fabrication in step 710, step 720 forms a photomask on a plane parallel to the first major surface of the display device. For example, the photomask may be formed over one of: (i) the array of pixel electrodes, (ii) the transparent common electrode, (iii) an alignment layer or (iv) the transparent layer or cover plate, or over any other layer forming a plane parallel to the first major surface. In embodiments, the photomask is formed as a chrome mask by depositing a chrome layer and etching the chrome layer using a reticle or another photomask pattern generator. The chrome mask comprises a photomask pattern of opaque/ masked chrome regions and transparent/unmasked regions where the chrome has been removed. The photomask comprises a pixel mask structure in accordance with the present disclosure.

After formation of the photomask in step 720, step 730 treats the display device by exposure to ultra-violet light during subsequent fabrication and/or assembly. In particular, step 730 irradiates the first major surface of the display device with ultra-violet light at a defined intensity and for a defined exposure time, according to the treatment process. For example, the treatment process may be a curing process, which requires a layer of the display device to be treated with a certain amount of ultraviolet-light in order to fully cure the layer. Since the photomask is configured with a central aperture and surrounding diffractive pattern that passes or transmits ultraviolet light, the corresponding area of the display device is treated.

As the skilled person will appreciate, the photomask is not limited to use with a LCOS SLM display device, but may be used during the fabrication of other types of display device.

After fabrication and assembly, the display device comprising a plurality of pixels may be used for display, as described herein. For example, the display device may be encoded with a hologram and the front surface may be illuminated by light of a visible or infra-red wavelength. Since the pixel mask structure of the photomask defines an aperture corresponding to the pixel area of the display device (i.e. the array of pixels), all of the pixels of the plurality of pixels are illuminated. The plurality of pixels spatially modulate the light in accordance with the hologram so as to form a holographic reconstruction (i.e. replay image) at a replay field (i.e. display area) on a replay plane, as described herein. Since the diffractive pattern of the first area of the pixel mask structure, surrounding the central unmasked/transparent aperture, diffracts incident light of visible and infra-red wavelengths, features of the display device, which are located in an area immediately surrounding the pixel area corresponding to the first area, are illuminated with a reduced amount of diffuse light. Accordingly, any reflection (or transmission) of light by such features of the display device has reduced intensity. This prevents the formation of undesirable visible artefacts in the display area. Furthermore, in the case of a reflective display device, the spatially modulated light is reflected back through the pixel mask structure of the photomask and out through the front surface of the display device. Accordingly, the spatially modulated light is transmitted through the central unmasked aperture formed by the pixel mask structure. In addition, any unmodulated light reflected by features of the display device, which are located in an area immediately surrounding the pixel area corresponding to the first area), is diffracted or spread out (i.e. diffused) by the diffractive pattern of the pixel mask structure. Thus, this unmodulated light is distributed away from the display area (i.e. visible parts of the replay field). This further prevents the creation of undesirable visible artefacts, and noise is further reduced in the display area.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example. Furthermore, the teachings of the present disclosure may be applied to non-holographic display devices.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display device configured to spatially modulate light having a first characteristic, wherein the display device comprises a Liquid Crystal on Silicon Spatial Light Modulator (LCOS SLM), and wherein the display device comprises:
    a plurality of pixels on a substrate, the plurality of pixels having a pixel area; and
    a pixel mask structure comprising a diffractive pattern that is configured to diffract light having the first characteristic and to transmit light having a second characteristic, wherein the pixel mask structure substantially surrounds the pixel area of the plurality of pixels to form a central aperture for light which does not contain a diffractive pattern, and wherein the first characteristic is a first wavelength or range of wavelengths of light and the second characteristic is a second wavelength or range of wavelengths of light.

2. The display device of claim 1, wherein the pixel mask structure comprises masked and/or opaque regions and unmasked and/or transparent regions.

3. The display device of claim 2, wherein the diffractive pattern is configured so that light having the first characteristic that is incident on the unmasked and/or transparent regions is diffracted and light having the second characteristic that is incident on the unmasked and/or transparent regions is transmitted without diffraction.

4. The display device of claim 2, wherein the diffractive pattern of the pixel mask structure is formed in a first area substantially surrounding an unmasked and/or transparent region of the pixel mask structure forming the central aperture for light.

5. The display device of claim 1, wherein the display device comprises a first major surface arranged to be illuminated with light having the first characteristic.

6. The display device of claim 1, wherein the pixel mask structure is disposed on one of:
    a first major surface of the display device, and
    a plane containing at least one electrode of the display device.

7. The display device of claim 1, wherein at least one of:
    the first characteristic is at least one of a visible or infra-red wavelength, a range of visible or infra-red wavelengths, or a combination thereof; or
    the second characteristic is at least one of an ultra-violet wavelength or a range of ultra-violet wavelengths.

8. The display device of claim 1, wherein the diffractive pattern comprises a diffraction grating pattern.

9. The display device of claim 1, wherein the diffractive pattern comprises a checkerboard pattern, and wherein the checkerboard pattern comprises first and second diffraction grating patterns arranged orthogonally to each other.

10. The display device of claim 9, wherein individual masked and/or opaque regions of the checkerboard pattern are extended to interconnect with diagonally adjacent masked and/or opaque regions so as to form diagonally extending interconnecting masked and/or opaque regions having curved sides.

11. The display device of claim 1, wherein the display device is a reflective display device.

12. A method of fabricating a display device comprising:
    forming a display device comprising a plurality of pixels on a substrate, wherein the display device is arranged to spatially modulate light having a first characteristic, and wherein the display device comprises a Liquid Crystal on Silicon Spatial Light Modulator (LCOS SLM);
    forming a photomask on a plane parallel to a first major surface of the display device, wherein the photomask has a pixel mask structure comprising a diffractive pattern that is configured to diffract light having the first characteristic and to transmit light having a second characteristic, wherein the pixel mask structure substantially surrounds the plurality of pixels of the display device to form a central aperture for light which does not contain a diffractive pattern, wherein the first characteristic is a first wavelength or range of wavelengths of light and the second characteristic is a second wavelength or range of wavelengths of light; and
    treating the display device, wherein treating the display device comprises exposing the first major surface of the display device to light having the second characteristic.

13. The method of claim 12, wherein forming the photomask comprises one of:
    forming the photomask on the first major surface of the display device; or
    forming the photomask on a layer of the display device comprising at least one electrode, wherein the at least one electrode comprises a common electrode or a plurality of pixels electrodes.

* * * * *